(12) United States Patent
Hambly et al.

(10) Patent No.: US 6,216,729 B1
(45) Date of Patent: Apr. 17, 2001

(54) BIDIRECTIONAL CHECK VALVE FOR HYDRAULIC SYSTEM

(75) Inventors: Hugh Hambly; Brian Thornton, both of New Brunswick (CA)

(73) Assignee: Parsons & Whittemore, Inc., Rye Brook, NY (US)

( * ) Notice: Subject to any disclaimer, the term of this patent is extended or adjusted under 35 U.S.C. 154(b) by 0 days.

(21) Appl. No.: 09/612,773

(22) Filed: Jul. 10, 2000

Related U.S. Application Data

(60) Provisional application No. 60/202,745, filed on May 8, 2000.

(51) Int. Cl.[7] ...................................................... F16K 17/26
(52) U.S. Cl. ................................................................ 137/493
(58) Field of Search ............................................. 137/493

(56) References Cited

U.S. PATENT DOCUMENTS

| | | | |
|---|---|---|---|
| 4,993,921 | * 2/1991 | Taplin et al. | 417/218 |
| 5,048,561 | * 9/1991 | Taplin et al. | 137/493.9 |
| 6,000,417 | * 12/1999 | Jacobs | 137/2 |

* cited by examiner

*Primary Examiner*—A. Michael Chambers
*Assistant Examiner*—Thomas L. McShane
(74) *Attorney, Agent, or Firm*—Cobrin & Gittes

(57) ABSTRACT

A bidirectional check valve controls movement of fluid. A valve body has an opening, a further opening and a passage connecting the opening and the further opening. A poppet is disposed within the passage of the valve body, and a spring is coupled to the poppet. A further poppet is disposed within the passage formed in the first mentioned poppet, and a further spring is coupled to the poppet and to the further poppet. When fluid passing through the opening in the valve body exerts a force on the poppet that is greater than the spring force, the further portion of the outer surface of the poppet is directed away from the further portion of the wall of the passage and permits the fluid to flow from the opening in the valve body through a channel and to the further opening in the valve body. When fluid passing through the further opening in the valve body exerts a force on the further poppet that is greater than the further spring force, the further portion of the outer surface of the further poppet is directed away from the further opening in the valve body to open a further channel in the poppet and permit the fluid to flow from the further opening in the valve body through the further channel, at least one opening in the further poppet, a further passage in the further poppet, a further opening in the further poppet and an opening in the poppet to the opening of the valve body.

14 Claims, 6 Drawing Sheets

BIDIRECTIONAL CHECK VALVE FOR HYDRAULIC SYSTEM

CROSS-REFERENCE TO RELATED APPLICATION

This application claims the priority of U.S. Provisional Application Ser. No. 60/202,745, filed May 8, 2000.

FIELD OF THE INVENTION

The invention relates to mechanical valves and, more particularly, to check valves that prevent the movement of fluids in a hydraulic system when the pressure of the fluid is less than a predetermined value.

BACKGROUND OF THE INVENTION

Conventional check valves permit liquids or gases to flow in only one direction. Such check valves are present in hydraulic systems, typically in mobile and fixed equipment, to control the flow path of fluids in the system. Check valves are also used in a variety of pumps to prevent the backward flow of liquids.

The hydraulic system is typically connected to other, auxiliary systems that may share a common fluid path with the hydraulic system. When a leak or hose failure occurs in the hydraulic system, fluid may also leak from the other systems that are connected to the hydraulic system and result in further fluid loss as well as cause the auxiliary systems to fail.

It is therefore desirable to prevent the loss of fluid from the auxiliary systems when a fluid is lost from the hydraulic system.

Further, fluid losses in the hydraulic system may be exacerbated by the auxiliary systems. When, for example, there is a back pressure from the auxiliary systems, pressurized fluid reservoirs or the like, the fluid pressure from the auxiliary systems aggravate any leaks present in the hydraulic system.

Also, when there is valve leakage from the auxiliary systems, fluid will also be lost from the hydraulic system.

Thus, there is also a need to automatically isolate the hydraulic system from the accessory systems to further fluid loss when there is a leak in either the hydraulic system or in an auxiliary system.

SUMMARY OF THE INVENTION

The present invention provides a bidirectional check valve that blocks the flow of fluid in a given direction when the fluid pressure in that direction falls below a predetermined value.

According to an aspect of the invention, a bidirectional check valve controls movement of fluid. A valve body has at least an opening and a further opening therein and has a passage connecting the opening and the further opening. A poppet is disposed within the passage of the valve body and is arranged such that at least a portion of an outer surface of the poppet and at least a portion of a wall of the passage of the valve body define at least one channel. The poppet has at least an opening therein in proximity to the opening in the valve body and has a passage connecting to the opening in the poppet. A spring is coupled to the poppet. The spring is arranged to drive the poppet in a direction such that when fluid passing through the opening in the valve body exerts a force on the poppet that is less than the spring force, a further portion of the outer surface of the poppet contacts a further portion of the passage wall of the valve body and prevents the fluid from flowing from the opening in the valve body into the channel. When the fluid exerts a force on the poppet that is greater than the spring force, the poppet is directed away from the further portion of the passage wall and permits the fluid to flow from the opening in the valve body through the channel and to the further opening in the valve body. A further poppet is disposed within the passage formed in the first mentioned poppet. The further spring is arranged such that at least a portion of an outer surface of the further poppet and at least a portion of a passage wall of the poppet define at least one further channel. The outer surface of the further poppet has at least an opening therein that connects to a passage formed within the further poppet. The passage within the further poppet connects to a further opening in the further poppet that is in proximity to the opening in the poppet. A further spring is coupled to the poppet and to the further poppet. The further spring is arranged to drive the further poppet in a further direction such that when fluid passing through the further opening in the valve body exerts a force on the further poppet that is less than the further spring force, a further portion of the outer surface of the further poppet blocks the further channel and prevents the fluid from flowing from the further opening in the valve body into the further channel. When the fluid exerts a force on the further poppet that is greater than the further spring force, the further portion of the outer surface of the further poppet is directed away from the further opening in the valve body to open the further channel and permit the fluid to flow from the further opening in the valve body through the further channel, the, at least, one opening in the further poppet, the further passage in the further poppet, the further opening in the further poppet and the opening in the poppet to the opening of the valve body.

According to another aspect of the invention, a hydraulic apparatus includes one or more supply lines, one or more return lines, a pump configured to drive fluid through the supply line at a supply pressure, and a flow component disposed between the supply line and the return line and providing a pressure differential in the fluid such that a return pressure in the return line is less than the supply pressure. The bidirectional check valve is disposed within the supply line and/or the return line.

Other features and advantages of the present invention will become apparent from the following detailed description of the invention with reference to the accompanying drawings.

BRIEF DESCRIPTION OF THE DRAWINGS

The invention will now be described in greater detail in the following detailed description with reference to the drawings in which.

DETAILED DESCRIPTION OF THE INVENTION

Figure 1:
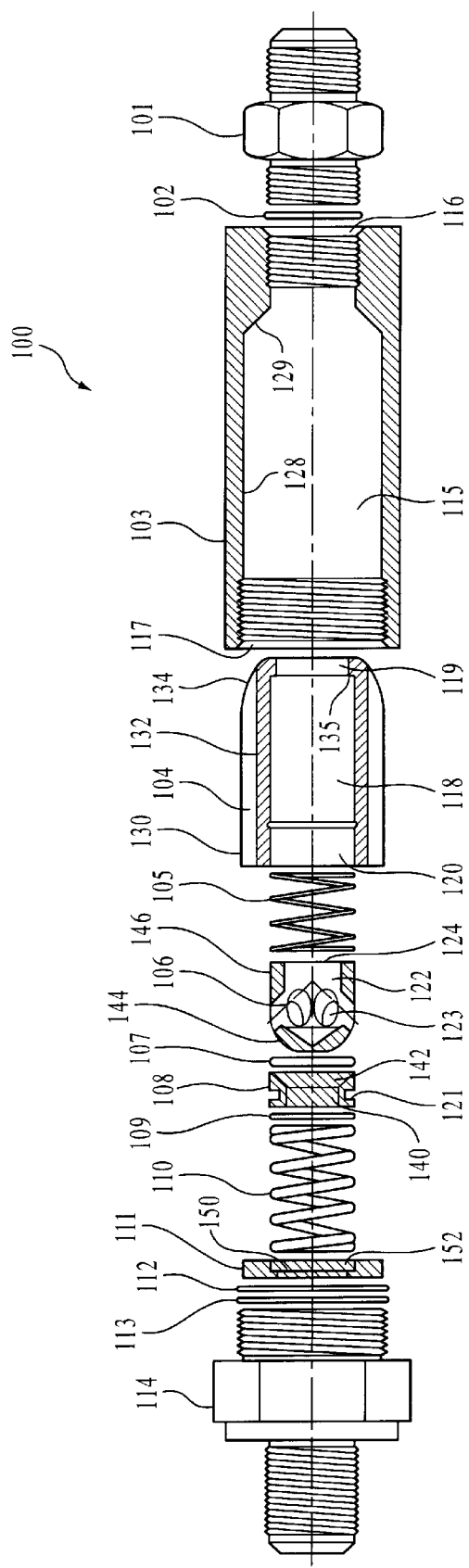
FIG. 1 shows an exploded view of a bidirectional check valve according to an embodiment of the invention.
Figure 2:
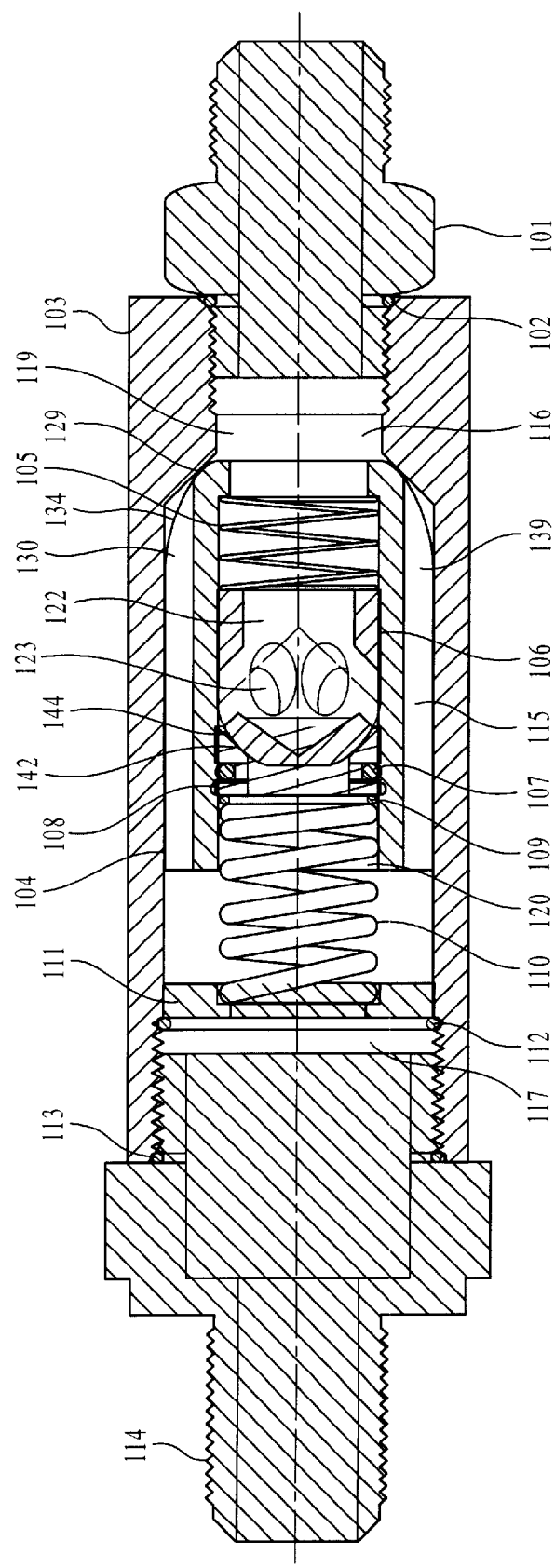
FIG. 2 shows the assembled bidirectional check valve of FIG. 1 in which the valve is closed to prevent fluid flow in both forward and reverse directions.

FIG. 1 shows an exploded view of a bidirectional check valve 100, which is also shown in FIG. 2 with its components assembled, according to an embodiment of the invention. The bidirectional check valve includes a valve block 103 having an opening or port 116 at one end and another opening or port 117 at its opposite end. The openings 116 and 117 are connected by a passage 115 that extends throughout the valve block. Though two ports are shown, the bidirectional check valve may include additional ports.

A poppet 104 is arranged within the passage 115 of the valve block or body 103, such as by insertion through the opening 117. The poppet is typically held in place by a portion of its outer wall 130 which contacts the passage wall 128. One or more flutes or grooves 132 are formed in the outer wall 120 and, together with the wall 128, define one or more channels 139. The poppet also includes a passage 118 having an opening 119 at one end and an opening 120 at an opposite end. The outer wall 130 of the poppet also includes a tapered portion 134 near the opening 119 which is configured so that at least a portion of the tapered region may fit snugly against a narrowed portion 129 of the inner wall 128 of the valve block.

A spring 105 is disposed within the passage 118 along a passage wall 133 of the poppet 104 and abuts a ledge 135 formed in the passage wall near the opening 119 of the poppet.

Also located within the passage 118, adjacent to the spring 105, is a further poppet 106. A passage 122 is formed within the further poppet 106 and has an opening 124 at one end of the further poppet. One or more openings 123 are present in the outer wall of the further poppet 106. The openings 123 open to an opposing end of the passage 122 which is adjacent to a tapered end 144 of the further poppet.

A valve seat 108 is arranged within the passage 118 adjacent to the tapered end of the further poppet 106. An opening 140 extends through the width of the valve seat 108 and includes a widened portion 144 at an end of the valve seat that is nearest the tapered end of the further poppet. The widened portion 144 of the opening and the tapered end of the further poppet together define a channel 148 between the valve seat 108 and openings 123 when the further poppet is displaced from the valve seat. A seal 107, such as an o-ring, is located in a groove or notch formed in the outer wall of the valve seat and prevents fluid leakage along the outer wall of the valve seat.

A retaining ring 109, such as a snap ring, is seated within the passage 118 of the poppet 104 and is located adjacent to another end of the valve seat 108 to hold the valve seat in its position. A spring 110 is also provided and has a portion that is inserted into the passage 118 and abuts the retaining ring 109. Another portion of the spring 110 extends beyond the poppet into the passage 115 of the valve block 103 and mates with an adapter 111. The adapter is also disposed within the passage 115 of the valve block 103. An opening 150 extends through the width of the adapter and includes a ledge 152 upon which the spring 110 is seated. A further retaining ring 112 is arranged within the passage 115 and is adjacent to the adapter 111.

Typically, an end adapter 111 is secured to the valve block 103 at opening 116, such as by threads or other types of connections, to permit the valve block to be connected to a hydraulic line or other hydraulic leads, for example. To prevent fluid leaks, a seal 102, which may be an o-ring, is provided between the end adapter 101 and the valve block 103.

Another end adapter 114 may be secured to the valve block 103 at opening 117 using threads or other types of connections, for example. Another seal 113, such as an o-ring, is provided between the end adapter 114 and the valve block 103.

FIG. 2 shows the bidirectional check valve 100 of the invention when the valve is closed in both directions to the passage of fluid. The valve 100 is closed in both directions under any of the following conditions: (1) when no fluid is present at both sides of the valve, (2) when no fluid is present at the opening 116 of the valve and the fluid pressure at the opening 117 is less than the force exerted by the spring 105, (3) when no fluid is present at opening 117 and the fluid pressure at opening 116 is less than the force exerted by the spring 110, and (4) when the fluid pressure on each side of the valve is less than the force exerted by springs 105 and 110, respectively.

In this configuration, the spring 110 drives the poppet 104 in the direction of opening 116 and secures part or all of the tapered end of the outer wall 130 of the poppet 104 against at least a part of the narrowed end 129 of the wall 128 of the passage 115 so that the flow of fluid from opening 116 into the channels 134 is cut off. Also, the spring 105 drives the further poppet 106 in the direction of opening 117 and secures part or all of the tapered end of the outer wall of the further poppet against at least a part of the widened end of the opening in the valve seat 108 so that the flow of fluid from opening 117 into the openings 123 of the further poppet 106 is cut off.

Figure 3:
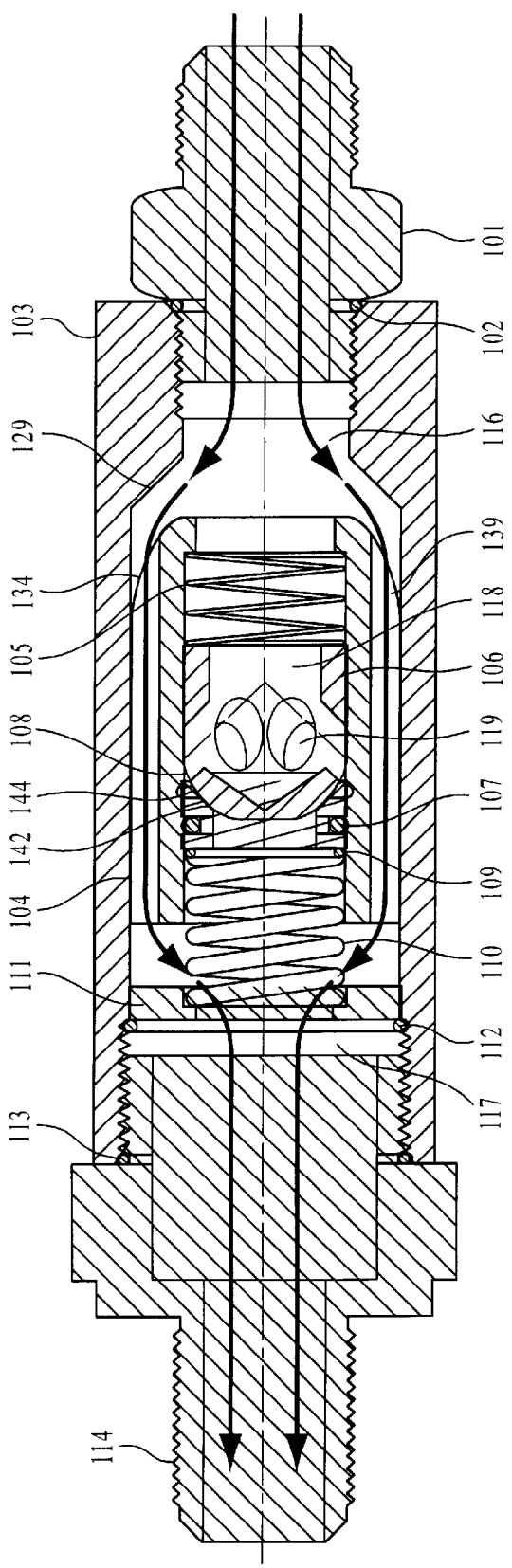
FIG. 3 shows the bidirectional check valve of FIGS. 1 and 2 in which the valve is open to permit fluid flow in a forward direction.

FIG. 3 depicts the bidirectional check valve 100 when the valve is open in one direction to permit the passage of fluid from the opening 116 to the opening 117, namely when the fluid pressure at opening 116 is greater than the force exerted by the spring 110.

The force of the fluid drives the poppet 104 in the direction of opening 117 and moves the tapered end 134 of the outer wall of the poppet 104 away from the narrowed end 129 of the wall of the passage 115 which permits the flow of fluid from opening 116 into the channels 139, past the end of the poppet 104 and through the opening 117.

The spring 105 holds the tapered end 144 of the outer wall of the further poppet 106 against the face of the widened end 142 of the opening in the valve seat 108 and prevents the flow of fluid in the opposite direction.

Figure 4:
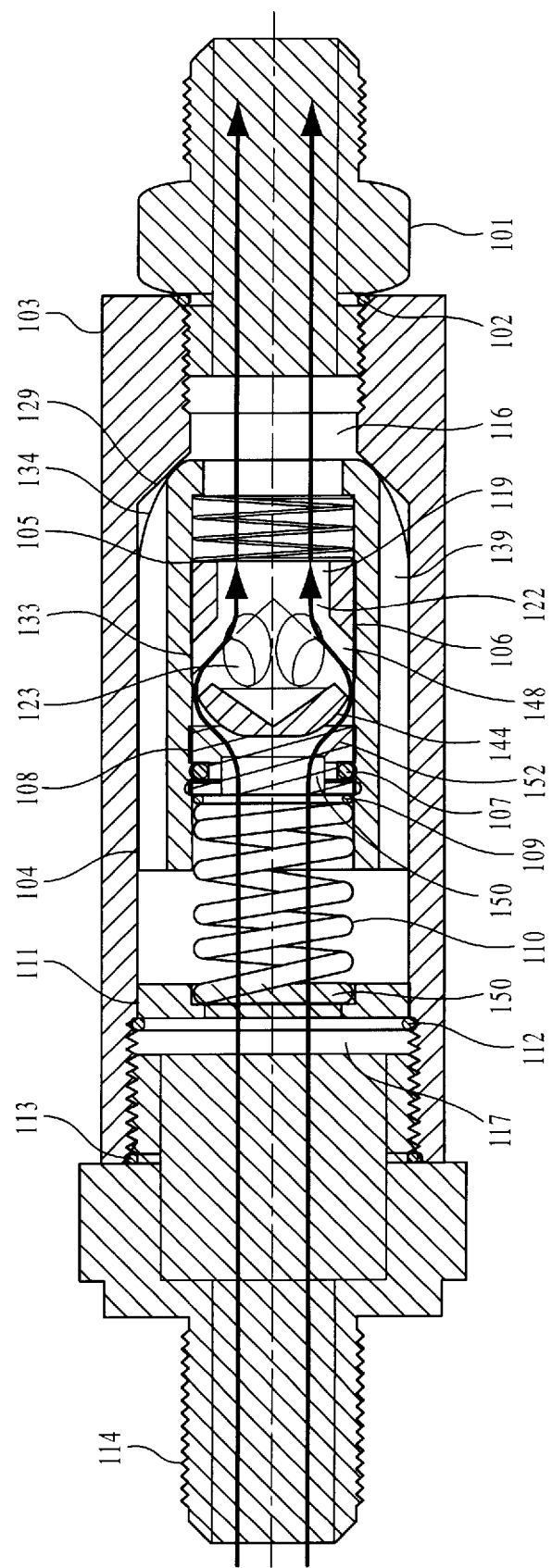
FIG. 4 shows the bidirectional check valve of FIGS. 1 and 2 in which the valve is open to permit fluid flow in a reverse direction.

FIG. 4 shows the bidirectional check valve 100 of the invention when the valve is open in the opposite direction to permit the passage of fluid from the opening 117 to the opening 116, namely when the fluid pressure at opening 117 is greater than the force exerted by the spring 105.

The force of the fluid drives the further poppet 106 in the direction of opening 116 and moves the tapered end 144 of the further poppet away from the widened end 142 of the opening in the valve seat 108 which permits the flow of fluid from the opening 117 through opening 150 of the adapter 111 and opening 140 of the valve seat 108, and into the channel 148 formed between the outer wall 146 of the further poppet and the wall 133 of the passage within the poppet. The fluid then flows through the openings 123 into the passage 122 within the further poppet and then through the opening 119 of the poppet to the opening 116 of the valve block.

The spring 110 holds the tapered end of the outer wall 130 of the poppet 104 against the narrowed end 129 of the wall 128 of the passage 115 and blocks the flow of fluid in the opposite direction.

Advantageously, the bidirectional check valve of the invention is a self-contained device that may be installed in a fluid line or conduit, such as in a fluid powered hydraulic system. As a further advantage, the direction of fluid flow through the valve is reversible, as is the direction in which fluid flow is blocked.

An additional advantage is that the valve closes in a given direction whenever the fluid pressure decreases to less than a predetermined value. Thus, when a leak occurs in a hose or other component in a hydraulic system that causes a drop in fluid pressure, the valve blocks the flow of fluid from other portions of the hydraulic system and maintains fluid pressure in these portions. The valve also reduces the amount of fluid that leaks out, thereby reducing possible environmental contamination from the fluid.

Similarly, the valve opens in a respective direction when the fluid pressure rises above a predetermined value. The pressure at which the valve opens or closes in a given direction may be determined by the choice of spring force for the spring that checks fluid flow in that direction.

Figure 5:
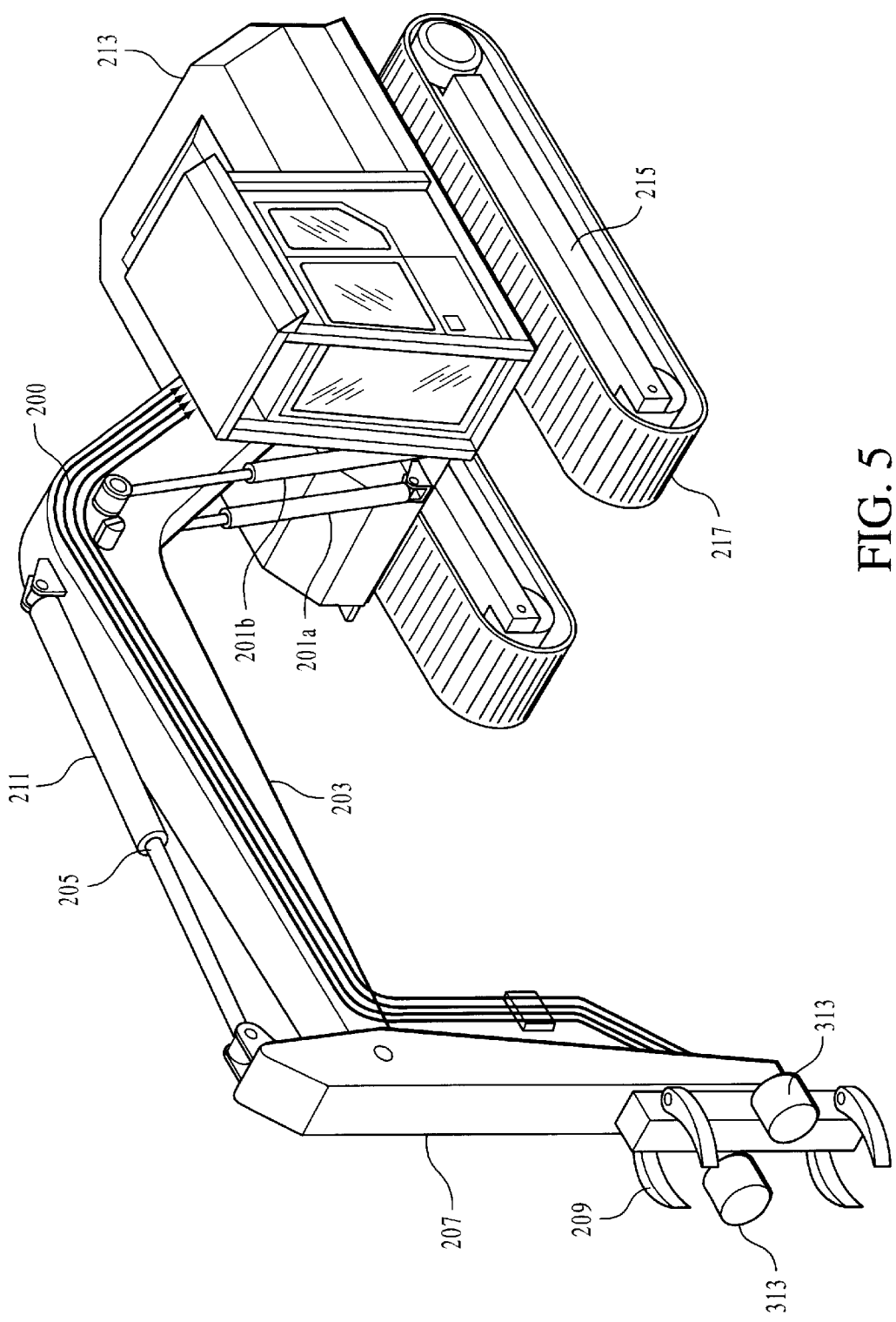
FIG. 5 shows a conventional excavator vehicle which includes a hydraulic system.

FIG. 5 illustrates an example of a conventional excavator vehicle which includes a hydraulic system 200. Hydraulically driven boom cylinders 201a, 201b drive a boom 203 in an upward or downward direction. A hydraulically driven arm cylinder 205 drives an arm 207 which is pivotally connected to the boom 203. Tongs 209 are coupled to the arm 207 and are driven by hydraulic motors 313. The tongs may be opened or closed by an operator to grasp large objects, such as cut trees, logs or beams.

Figure 6:
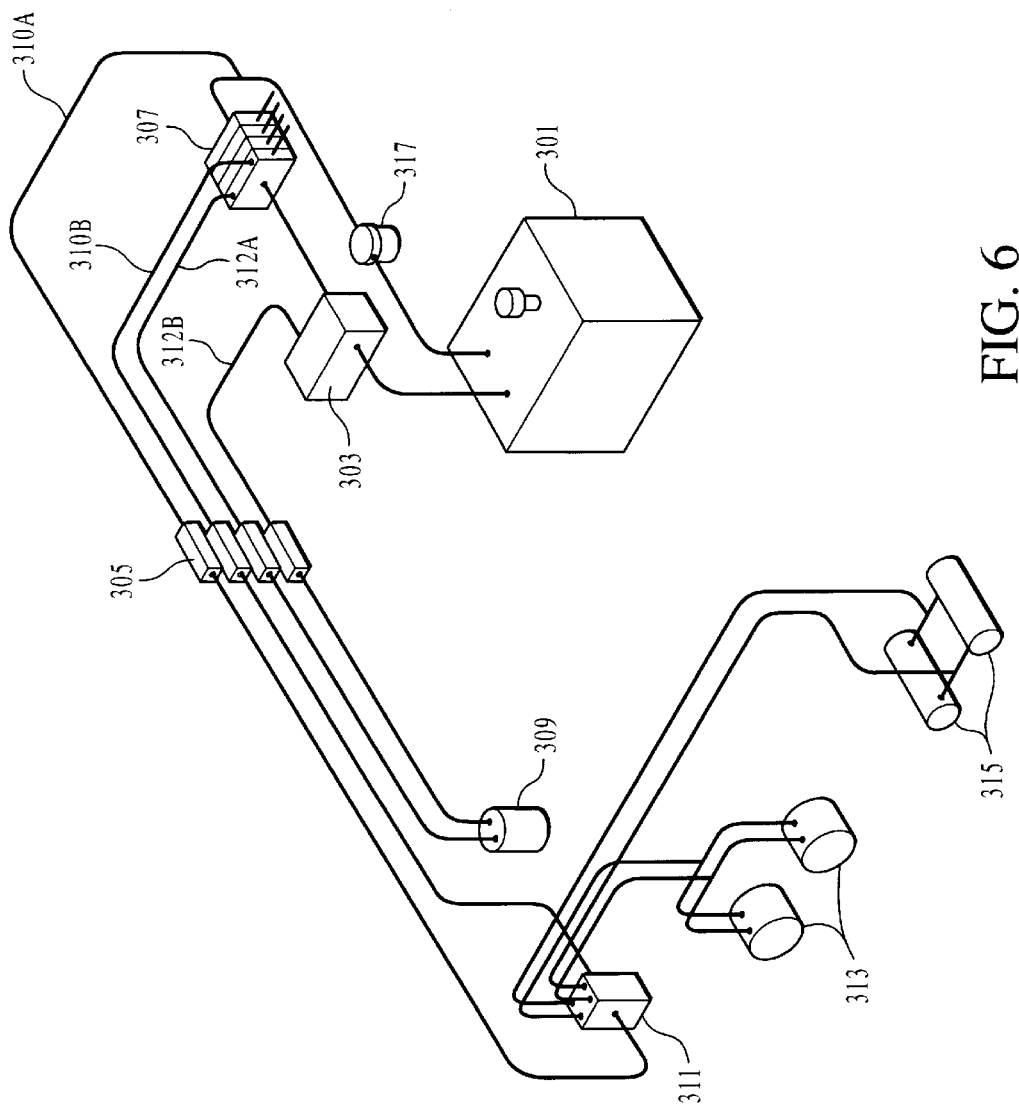
FIG. 6 shows a hydraulic system of the excavator vehicle shown in FIG. 5 that is modified to incorporate the valve of FIGS. 1–4.

FIG. 6 shows an example of a closed-loop hydraulic system which may be employed in the conventional excavator vehicle of FIG. 5 and which includes one or more of the bidirectional check valves of the invention. A hydraulic pump 303 pumps hydraulic fluid from a reservoir 301 through one or more supply lines. As an example, the pump 303 drives hydraulic fluid through a supply line 310A via valve sections 307 to a rotator 309. The fluid is returned to the reservoir 301 via a return line 310B and a filter 317. Alternatively, the pump 303 drives hydraulic fluid via the valve sections 307 and a supply line 312A to further valve sections 311 and then to hydraulic motors 313 and/or hydraulic cylinders 315. The fluid is then returned via a return line 312B to the reservoir 301.

The bidirectional check valves 305 of the invention may be installed in one or more of the supply lines to permit fluid to be delivered to the rotator 309 or to the valve sections 311 only when the pressure in the supply lines exceeds a predetermined value. The bidirectional check valves may also be installed in one or more of the return lines to permit fluid to be returned from the rotator 309 or from the valve sections 311 only when the pressure in the return lines exceed a predetermined value. Thus, hydraulic fluid is only supplied to the rotator 309, the hydraulic motors 313 and the hydraulic cylinders 315 when there is sufficient fluid pressure for their proper operation. Further, when a leak occurs in one or more of the supply or return lines, the bidirectional check valves close and prevent the sudden loss of hydraulic fluid from the rotator 309, the hydraulic motors 313 and/or the hydraulic cylinders 315, thereby avoiding a sudden and potentially catastrophic failure.

The bidirectional check valve of the invention may also be employed in other applications that use a hydraulic system.

Although the present invention has been described in relation to particular embodiments thereof, many other variations and modifications and other uses may become apparent to those skilled in the art. It is preferred, therefore, that the present invention be limited not by this specific disclosure herein, but only by the appended claims.

What is claimed is:

1. A bidirectional check valve for controlling movement of fluid, said bidirectional check valve comprising:

a valve body having at least an opening and a further opening therein and having a passage connecting said opening and said further opening;

a poppet disposed within said passage of said valve body and arranged such that at least a portion of an outer surface of said poppet and at least a portion of a wall of said passage of said valve body define at least one channel; said poppet having at least an opening therein in proximity to said opening in said valve body and a passage connecting to said opening in said poppet;

a spring coupled to said poppet and arranged to drive said poppet in a direction such that when fluid passing through said opening in said valve body exerts a force on said poppet that is less than said spring force, a further portion of said outer surface of said poppet contacts a further portion of said passage wall of said valve body and prevents said fluid from flowing from said opening in said valve body into said channel, and when said fluid exerts a force on said poppet that is greater than said spring force, said poppet is directed away from said further portion of said passage wall and permits said fluid to flow from said opening in said valve body through said channel and to said further opening in said valve body;

a further poppet disposed within said passage formed in said first mentioned poppet and arranged such that at least a portion of an outer surface of said further poppet and at least a portion of a passage wall of said poppet define at least one further channel; said outer surface of said further poppet having at least an opening therein that connects to a passage formed within said further poppet; said passage within said further poppet connecting to a further opening in said further poppet that is in proximity to said opening in said poppet; and a further spring coupled to said poppet and to said further poppet and arranged to drive said further poppet in a further direction such that when fluid passing through said further opening in said valve body exerts a force on said further poppet that is less than said further spring force, a further portion of said outer surface of said further poppet blocks said further channel and prevents said fluid from flowing from said further opening in said valve body into said further channel, and when said fluid exerts a force on said further poppet that is greater than said further spring force, said further portion of said outer surface of said further poppet is directed away from said further opening in said valve body to open said further channel and permit said fluid to flow from said further opening in said valve body through said further channel, said at least one opening in said further poppet, said further passage in said further poppet, said further opening in said further poppet and said opening in said poppet to said opening of said valve body.

2. The valve of claim 1 wherein said portion of said outer surface of said poppet includes at least one fluted portion.

3. The valve of claim 1 wherein said poppet includes a further opening therein in proximity to said further opening in said valve body; and said passage connects said opening and said further opening in said poppet.

4. The valve of claim 1 wherein said further portion of said outer surface of said poppet includes a tapered region, and said further portion of said passage wall of said valve body surrounds a narrowed portion of said passage.

5. The valve of claim 1 wherein said poppet includes an inwardly directed projection, and an end of said spring abuts said inwardly directed projection.

6. The valve of claim 5 further comprising a valve seat disposed in said passage of said poppet between said inwardly directed projection and said further poppet.

7. The valve of claim 6 wherein said further portion of said outer surface of said further poppet and said valve seat are configured such that when said fluid passing through said further opening in said valve body exerts a force on said further poppet that is less than said further spring force, said further portion of said outer surface of said further poppet contacts said valve seat.

8. The valve of claim 1 wherein said further portion of said outer surface of said further poppet comprises a tapered region.

9. The valve of claim 1 further comprising an adapter disposed in said passage of said valve body in proximity to said further opening in said valve body, and another end of said spring abuts a ledge formed in said adapter.

10. The valve of claim 1 wherein said passage wall of said poppet includes a ledge adjacent to said opening in said poppet, and an end of said further spring abuts said ledge.

11. The valve of claim 1 wherein said spring and said poppet are arranged such that when said fluid passing through said opening in said valve body exerts a force on said poppet that is less than said spring force, said poppet is driven toward said opening in said valve body, and when said fluid passing through said opening in said valve body exerts a force on said poppet that is greater than said spring force, said poppet is driven away from said opening in said valve body.

12. The valve of claim 1 wherein said further spring and said further poppet are arranged such that when said fluid passing through said further opening in said valve body exerts a force on said further poppet that is less than said further spring force, said further poppet is driven toward said further opening in said valve body, and when said fluid passing through said further opening in said valve body exerts a force on said further poppet that is greater than said further spring force, said further poppet is driven away from said further opening in said valve body.

13. A method of bidirectionally controlling movement of fluid, said method valve comprising the steps of:
   providing a valve body having at least an opening and a further opening therein and having a passage connecting said opening and said further opening;
   disposing a poppet within said passage of said valve body and arranging said poppet such that at least a portion of an outer surface of said poppet and at least a portion of a wall of said passage of said valve body define at least one channel; said poppet having at least an opening therein in proximity to said opening in said valve body and a passage connecting to said opening in said poppet;
   coupling a spring to said poppet to drive said poppet in a direction such that when fluid passing through said opening in said valve body exerts a force on said poppet that is less than said spring force, a further portion of said outer surface of said poppet contacts a further portion of said passage wall of said valve body and prevents said fluid from flowing from said opening in said valve body into said channel, and when said fluid exerts a force on said poppet that is greater than said spring force, said poppet is directed away from said further portion of said passage wall and permits said fluid to flow from said opening in said valve body through said channel and to said further opening in said valve body;
   disposing a further poppet within said passage formed in said first mentioned poppet and arranging said further poppet such that at least a portion of an outer surface of said further poppet and at least a portion of a passage wall of said poppet define at least one further channel; said outer surface of said further poppet having at least an opening therein that connects to a passage formed within said further poppet; said passage within said further poppet connecting to a further opening in said further poppet that is in proximity to said opening in said poppet; and
   coupling a further spring to said poppet and to said further poppet to drive said further poppet in a further direction such that when fluid passing through said further opening in said valve body exerts a force on said further poppet that is less than said further spring force, a further portion of said outer surface of said further poppet blocks said further channel and prevents said fluid from flowing from said further opening in said valve body into said further channel, and when said fluid exerts a force on said further poppet that is greater than said further spring force, said further portion of said outer surface of said further poppet is directed away from said further opening in said valve body to open said further channel and permit said fluid to flow from said further opening in said valve body through said further channel, at least one said opening in said further poppet, said further passage in said further poppet, said further opening in said further poppet and said opening in said poppet to said opening of said valve body.

14. A hydraulic apparatus, comprising:
   at least one supply line;
   at least one return line;
   a pump configured to drive fluid through said supply line at a supply pressure;
   a flow component disposed between said supply line and said return line and providing a pressure differential in the fluid such that a fluid pressure in the return line is less than the supply pressure; and
   a bidirectional check valve disposed within at least one of said supply line said return line;
   said bidirectional check valve comprising:
      a valve body having at least an opening and a further opening therein and having a passage connecting said opening and said further opening;
      a poppet disposed within said passage of said valve body and arranged such that at least a portion of an outer surface of said poppet and at least a portion of a wall of said passage of said valve body define at least one channel; said poppet having at least an opening therein in proximity to said opening in said valve body and a passage connecting to said opening in said poppet;
      a spring coupled to said poppet and arranged to drive said poppet in a direction such that when fluid passing through said opening in said valve body exerts a force on said poppet that is less than said spring force, a further portion of said outer surface of said poppet contacts a further portion of said passage wall of said valve body and prevents said fluid from flowing from said opening in said valve body into said channel, and when said fluid exerts a force on said poppet that is greater than said spring force, said poppet is directed away from said further portion of said passage wall and permits said fluid to flow from said opening in said valve body through said channel and to said further opening in said valve body;

a further poppet disposed within said passage formed in said first mentioned poppet and arranged such that at least a portion of an outer surface of said further poppet and at least a portion of a passage wall of said poppet define at least one further channel; said outer surface of said further poppet having at least an opening therein that connects to a passage formed within said further poppet, said passage within said further poppet connecting to a further opening in said further poppet that is in proximity to said opening in said poppet; and a further spring coupled to said poppet and to said further poppet and arranged to drive said further poppet in a further direction such that when fluid passing through said further opening in said valve body exerts a force on said further poppet that is less than said further spring force, a further portion of said outer surface of said further poppet contacts a further portion of said passage wall of said poppet and prevents said fluid from flowing from said further opening in said valve body into said further channel, and when said fluid exerts a force on said further poppet that is greater than said further spring force, said further portion of said outer surface of said further poppet is directed away from said further portion of said wall of said poppet and permits said fluid to flow from said further opening in said valve body through said further channel, said at least one opening in said further poppet, said further passage in said further poppet, said further opening in said further poppet and said opening in said poppet to said opening of said valve body.

* * * * *

(12) EX PARTE REEXAMINATION CERTIFICATE (5239th)
United States Patent
Hambly et al.

(10) Number: US 6,216,729 C1
(45) Certificate Issued: Nov. 29, 2005

(54) BIDIRECTIONAL CHECK VALVE FOR HYDRAULIC SYSTEM

(75) Inventors: Hugh Hambly, New Brunswick, CA (US); Brian Thornton, New Brunswick, CA (US)

(73) Assignee: Parsons & Whittemore, Inc., Rye Brook, NY (US)

Reexamination Request:
No. 90/006,050, Jul. 3, 2001

Reexamination Certificate for:
Patent No.: 6,216,729
Issued: Apr. 17, 2001
Appl. No.: 09/612,773
Filed: Jul. 10, 2000

Related U.S. Application Data

(60) Provisional application No. 60/202,745, filed on May 8, 2000.

(51) Int. Cl.$^7$ ............................................. F16K 17/26
(52) U.S. Cl. ..................................................... 137/493
(58) Field of Search ............................... 137/493, 493.3, 137/493.9, 540, 543.19, 543.21

(56) References Cited

U.S. PATENT DOCUMENTS

| | | |
|---|---|---|
| 1,933,454 A | 10/1933 | Sidney |
| 2,930,401 A * | 3/1960 | Cowan .................. 137/543.21 |
| 3,127,907 A | 4/1964 | Novak |
| 3,153,423 A | 10/1964 | Biello et al. |
| 3,392,633 A | 7/1968 | Koakaly |
| 3,770,009 A * | 11/1973 | Miller ................... 137/543.19 |
| 3,943,959 A | 3/1976 | Kirkland |
| 4,217,927 A | 8/1980 | Morita |
| 4,270,567 A | 6/1981 | Tsukimoto |
| 4,537,384 A | 8/1985 | Petersen et al. |
| 4,561,559 A | 12/1985 | Rutan et al. |
| 4,628,957 A | 12/1986 | Höfer et al. |
| 4,648,369 A | 3/1987 | Wannenwetsch |
| 4,651,779 A | 3/1987 | Filippi et al. |
| 4,673,051 A | 6/1987 | Darling et al. |
| 4,692,102 A | 9/1987 | Häfele et al. |
| 4,718,442 A * | 1/1988 | Nicoll ......................... 137/540 |
| 4,727,792 A | 3/1988 | Häussler |
| 4,834,134 A | 5/1989 | Asami et al. |
| 4,919,166 A | 4/1990 | Sims |
| 4,926,902 A | 5/1990 | Nakamura et al. |
| 4,969,697 A | 11/1990 | Lindenman |
| 5,125,323 A | 6/1992 | Yonezawa |
| 5,127,313 A | 7/1992 | Yonezawa |
| 5,183,075 A * | 2/1993 | Stein ...................... 137/543.21 |
| 5,311,901 A | 5/1994 | Ostrom |
| 5,582,202 A | 12/1996 | Schultz et al. |
| 5,727,529 A | 3/1998 | Tuckey |
| 5,778,925 A | 7/1998 | Cooke |
| 5,807,081 A | 9/1998 | Schutte et al. |
| 5,950,669 A | 9/1999 | Fehlmann et al. |

* cited by examiner

Primary Examiner—Stephen Hepperle

(57) ABSTRACT

A bidirectional check valve controls movement of fluid. A valve body has an opening, a further opening and a passage connecting the opening and the further opening. A poppet is disposed within the passage of the valve body, and a spring is coupled to the poppet. A further poppet is disposed within the passage formed in the first mentioned poppet, and a further spring is coupled to the poppet and to the further poppet. When fluid passing through the opening in the valve body exerts a force on the poppet that is greater than the spring force, the further portion of the outer surface of the poppet is directed away from the further portion of the wall of the passage and permits the fluid to flow from the opening in the valve body through a channel and to the further opening in the valve body. When fluid passing through the further opening in the valve body exerts a force on the further poppet that is greater than the further spring force, the further portion of the outer surface of the further poppet is directed away from the further opening in the valve body to open a further channel in the poppet and permit the fluid to flow from the further opening in the valve body through the further channel, at least one opening in the further poppet, a further passage in the further poppet, a further opening in the further poppet and an opening in the poppet to the opening of the valve body.

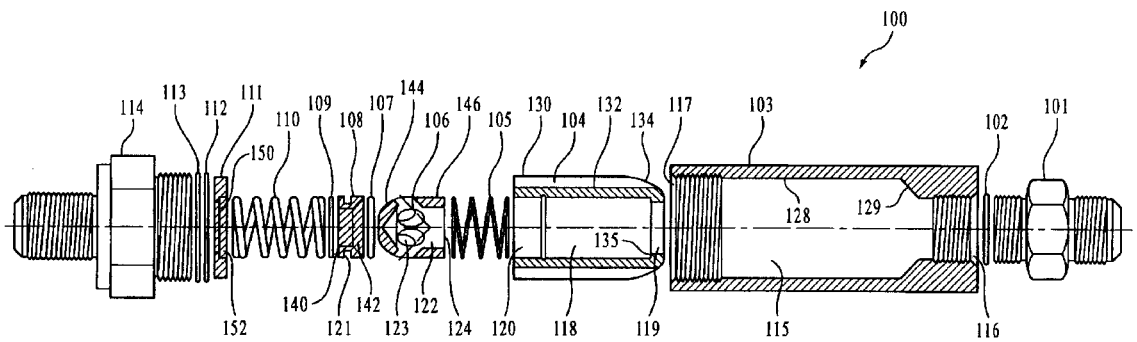

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–14 are cancelled.

* * * * *